United States Patent
Jabbour, Jr. et al.

(10) Patent No.: US 7,614,707 B2
(45) Date of Patent: Nov. 10, 2009

(54) WHEEL RIM AND WHEEL HUB MOUNT ASSEMBLY

(75) Inventors: Edward Jabbour, Jr., Hastings-on-Hudson, NY (US); Yuk Kei Chan, New Territories (HK)

(73) Assignee: Ridemakerz, LLC, Rancho Santa Margarita, CA (US)

( * ) Notice: Subject to any disclaimer, the term of this patent is extended or adjusted under 35 U.S.C. 154(b) by 297 days.

(21) Appl. No.: 11/736,141

(22) Filed: Apr. 17, 2007

(65) Prior Publication Data
US 2008/0261488 A1 Oct. 23, 2008

(51) Int. Cl.
*B60B 27/02* (2006.01)
(52) U.S. Cl. .............................. 301/111.03; 301/111.01
(58) Field of Classification Search .............. 301/5.301, 301/5.305, 5.309, 111.01, 111.03; 16/18 R, 16/45; 446/95
See application file for complete search history.

(56) References Cited

U.S. PATENT DOCUMENTS

| | | | |
|---|---|---|---|
| RE4,830 E | 3/1872 | Elder | |
| 2,497,224 A | 2/1950 | Laure | |
| 2,568,374 A | 9/1951 | Thomas | |
| 3,201,897 A | 8/1965 | Balthazor | |
| 3,263,363 A | 8/1966 | Doe | |
| 4,299,051 A | 11/1981 | Pauly et al. | |
| 4,643,696 A | 2/1987 | Law | |
| 4,690,656 A | 9/1987 | Friedman et al. | |
| 4,693,696 A | 9/1987 | Buck | |
| 4,824,413 A | 4/1989 | Perkitny | |
| 4,963,115 A | 10/1990 | Stowell Davin et al. | |
| 5,167,563 A | 12/1992 | Saffer | |
| 5,173,071 A | 12/1992 | Hoeting | |
| 5,487,692 A | 1/1996 | Mowrer et al. | |
| 5,647,828 A | 7/1997 | Chen | |
| 5,902,018 A | 5/1999 | Owen et al. | |
| 5,919,072 A | 7/1999 | Pohlman | |
| 6,637,835 B2 | 10/2003 | Morris | |
| 6,874,941 B2 * | 4/2005 | van Egeraat | 301/5.301 |
| 6,957,996 B2 | 10/2005 | Hui | |
| 2005/0173894 A1 | 8/2005 | Shapiro | |
| 2005/0250416 A1 | 11/2005 | Barthold | |

* cited by examiner

*Primary Examiner*—Jason R Bellinger
(74) *Attorney, Agent, or Firm*—Mark E. Stallion, Esq.; Husch Blackwell Sanders LLP

(57) ABSTRACT

A quick mount and dismount design and method of installation for a toy rim and tire/wheel assembly comprising a tire/wheel having an outer tire portion and an inner core ring housing inside the outer tire portion, where the inner core ring housing has an interior cylindrical wall, where the interior wall has multiple ring like recesses. The inner core ring housing can be divided by an expansion seam to allow for press fitting the rim on the tire and press fitting the assembly onto the hub.

16 Claims, 4 Drawing Sheets

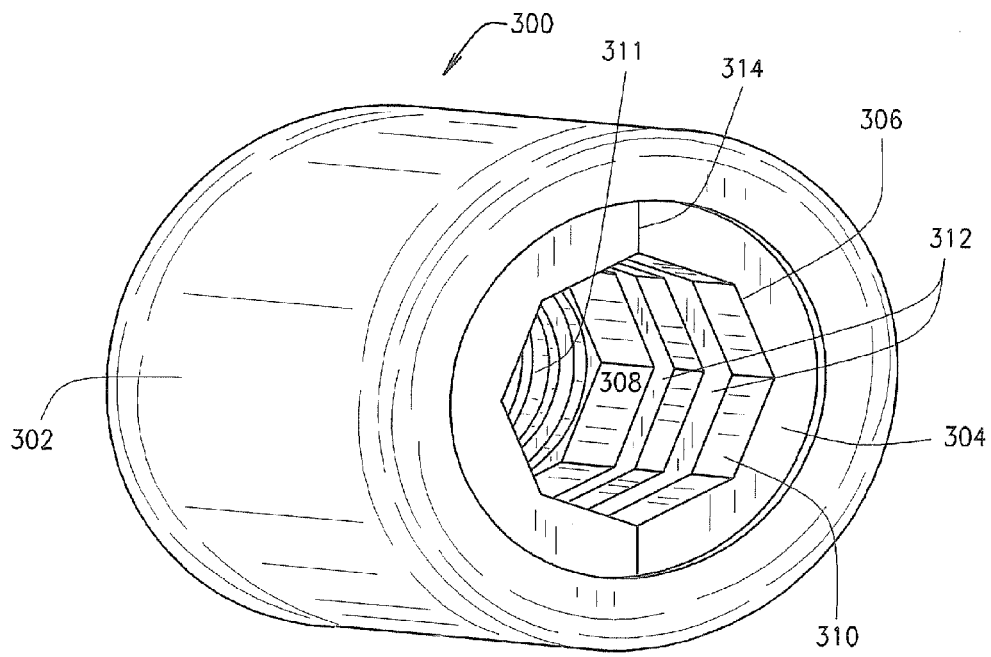
FIG. 3
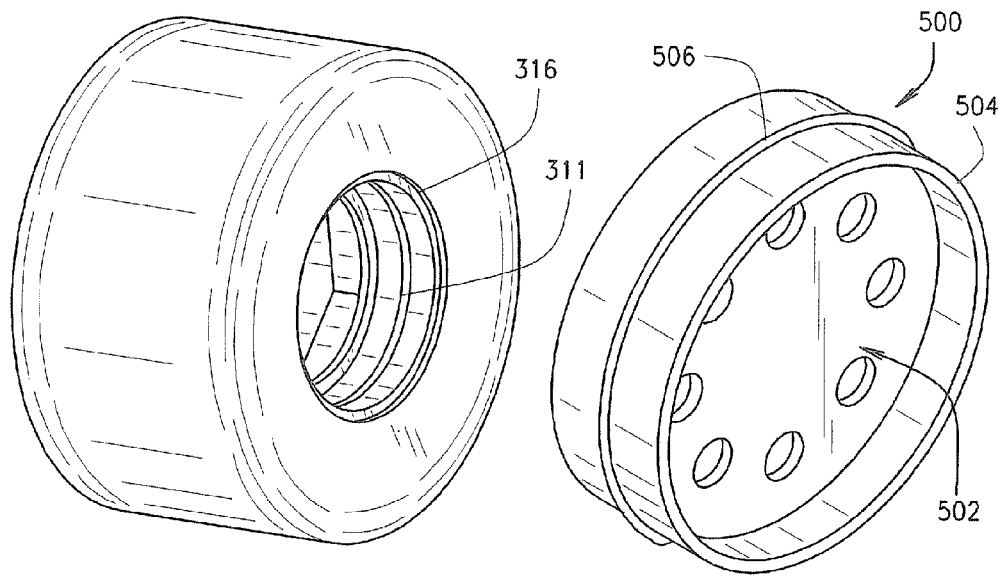
FIG. 4
FIG. 5

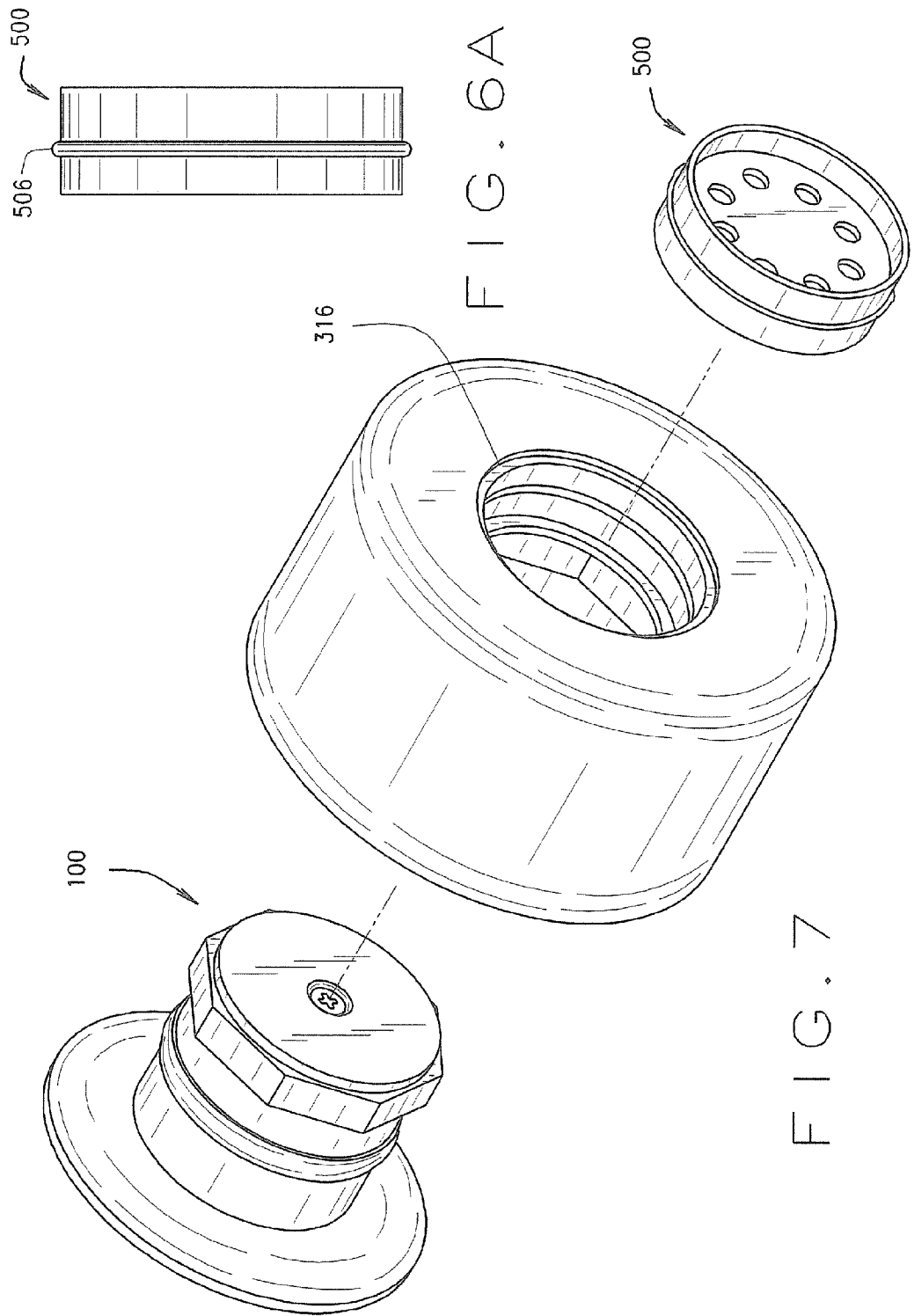

WHEEL RIM AND WHEEL HUB MOUNT ASSEMBLY

BACKGROUND OF INVENTION

1. Field of Invention

This invention relates generally to toy vehicle wheels and, more particularly, to mounting mechanisms for toy vehicle wheels.

2. Background Art

There are various types of toy vehicles on the market. Travel of a toy vehicle is often induced by manually pushing a toy vehicle, which has free rotating wheels. The wheels can freely rotate on an axle that is rotatably attached to the chassis of the toy vehicle. Travel can also be induced by an electrical motor powering rotation of the front or rear wheels or powering all four, as for example with radio controlled (RC) vehicles. There are also various other methods to induce travel.

Many toy vehicles have interchangeable parts such that the appearance of the vehicle can be modified or customized to the owner's choosing. This is particularly popular with RC toy vehicles. For example, various interchangeable body styles can be designed such that each body style will fit on the same chassis. There can be various mounting mechanisms for securely mounting and removing a body. There are also various toy vehicle designs that allow for tires/wheels and rims to be removed and replaced with a different styled wheel that is interchangeable. For example, various rim designs can be interchangeably paired with various tire/wheel designs. The various tire and rim combinations chosen can then be interchangeably installed on the wheel hub or axle that is rotatably attached a chassis.

Normally, the attachment and removal of rims and tire/wheels from a toy vehicle's wheel hub, when it is an option, requires the use of a tool to tighten or loosen a screw or bolt, usually a Philips head screwdriver or hex wrench. This can be challenging and even dangerous for younger children and time consuming for older individuals.

The nature of some toy vehicle concepts require that the assembly process be as quick and simple and safe as possible. A method and design is needed where the design allows wheels to be installed and removed that meets all three criteria. A design is needed that allows for a quick and easy way to manually attach, remove and replace rims on a wheel/tire assembly and the wheel/tire assembly on the wheel hubs at each end of a vehicle axle, without the use of any tools.

BRIEF SUMMARY OF INVENTION

The invention is a quick mount and dismount design for a toy rim and tire/wheel assembly comprising a tire/wheel having an outer tire portion and an inner core a housing inside the outer tire portion, where the inner core housing has a lateral bore having an interior cylindrical wall, where the interior wall has multiple ring-like or annular recesses. The inner core housing can be divided by an expansion seam to allow for press fitting the rim on the tire and press fitting the assembly onto a wheel hub that is rotatably mounted on the vehicle's chassis by an axle, bearing or other like member.

The design allows for a quick and easy way to manually attach, remove and replace rims on a wheel/tire assembly and the wheel/tire assembly on the wheel hubs at each end of a vehicle axle, without the use of any tools.

Normally, the attachment and removal of rims and wheels from toy vehicles, when it is an option, requires the use of a tool to tighten a screw or bolt, usually a Philips head screwdriver or hex wrench. This can be challenging and even dangerous for younger children and time consuming for older individuals. However, for some toy concepts it is required that the assembly process be as quick and simple and as safe as possible, which is often driven by the targeted age for the toy. The simple "manual snap-on" method taught by the present invention, by which the design allows wheels to be assembled, meets all three criteria—quick, simple and safe.

The assembly design can comprise three main parts; 1. a wheel hub (which is permanently and rotatably attached to a vehicle chassis by a vehicle axle), 2. a tire/wheel assembly (consisting of an inner core ring housing and the outer tire) and 3. a rim or wheel cover.

The wheel hub is essentially a cylinder with a raised (for example, about approx., 1 mm) ring or bead centrally located with respect to its outside end and its inside end (proximate the chassis) and extending around its outer perimeter. Proximate the outside end of the hub (away from the chassis member) there can be a built in circumscribed raised octagonal cap ring or a cap ring having another polygonal geometry (triangle, square, pentagon, hexagon) or other irregular polygons or non-circular geometries) or other geometry that will resist rotation of the tire/wheel with respect to the hub.

The tire/wheel assembly includes two primary parts; the inner core ring housing and the outer tire tread. One side-end of the core ring housing which connects to the hub can have an octagonal opening corresponding to a raised octagonal cap ring of the wheel hub for receiving the wheel hub. The male octagonal cap of the hub can be dimensioned to slide into the female octagonal opening of the core ring housing with minimal clearance for a snug engagement. The snug mating of the cap ring of the wheel hub and the opening of the core ring housing prevents slippage or rotation of the tire/wheel assembly with respect to the wheel hub.

The apparatus can include a series of annular recesses or recessed rings and annular cross sections along perimeters of the inner wall of the tire's core ring housing, which correspond with the raised ring and octagonal cap of the hub. This allows for a snap locking fit between the hub and tire. The octagonal shape of the opening and the annular cross sections along the axial length of the bore can eliminate any slippage which would occur if both the male hub and female tire ring housing had a circular cross section and smooth. The raised ring or bead of the wheel hub can snap in place in the recess ring in the interior wall of the core ring housing. The octagonal shape of the inner core or bore can be modified to any polygonal shape or other shape that would prevent rotation with respect to the hub.

Similarly, the rim has a raised ring about its perimeter wall, which corresponds with another indented annular ring or recess on the tire's core ring housing core wall opposite the hub end. This allows for a snap locking fit between the rim and tire.

To remove the tire from the hub, one simply needs to manually pull the tire away from the hub with a moderate amount of force so as to disengage the locked rings. To remove the hub from the tire, one can insert a finger through the octagonal opening of the tire core ring housing and push on the inside of the rim until the interlocking rings are disengaged.

These and other advantageous features of the present invention will be in part apparent and in part pointed out herein below.

BRIEF DESCRIPTION OF THE DRAWINGS

For a better understanding of the present invention, reference may be made to the accompanying drawings in which:

FIG. 3 is a side perspective view of the tire/wheel assembly for the wheel hub interface;

FIG. 4 is an opposing side perspective view of the tire/wheel assembly for the rim interface;

FIG. 5 is a perspective view of the rim;

FIG. 6A is a front plan view of the rim showing the raised rib; and

FIG. 7 is an exploded view of the rim to tire/wheel to wheel hub interface.

Figure 1:
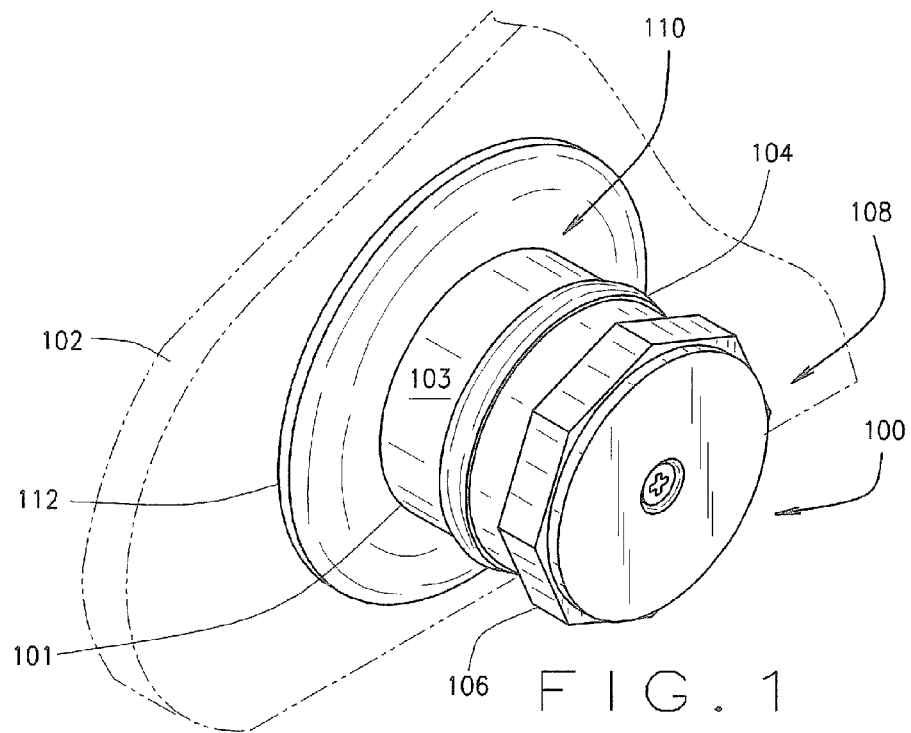
FIG. 1 is a perspective view of the wheel hub and chassis interface.
Figure 2:
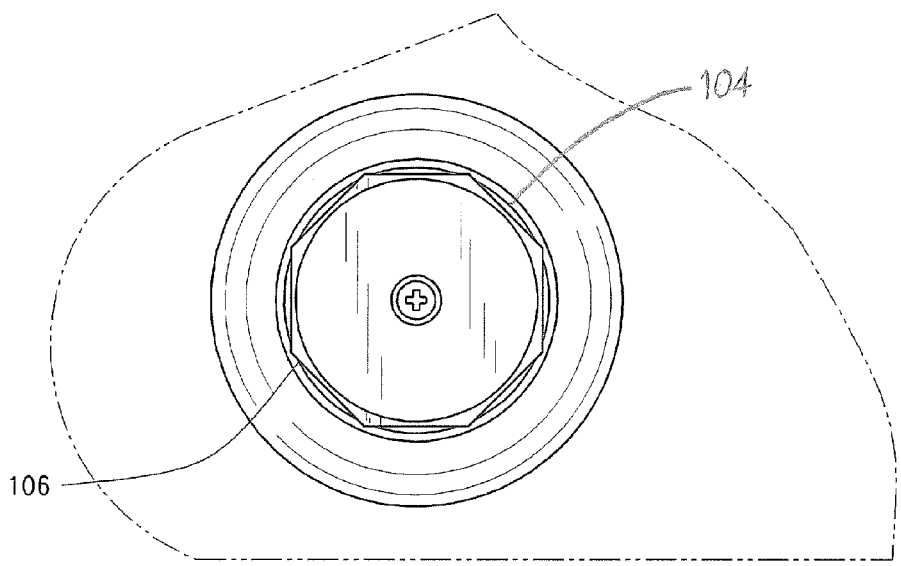
FIG. 2 is a frontal side plan view of the wheel hub and chassis interface.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF INVENTION

According to the embodiment(s) of the present invention, various views are illustrated in FIG. 1-6 and like reference numerals are being used consistently throughout to refer to like and corresponding parts of the invention for all of the various views and figures of the drawing. Also, please note that the first digit(s) of the reference number for a given item or part of the invention should correspond to the Fig. number in which the item or part is first identified.

One embodiment of the present invention comprising a tire/wheel having an outer tire portion and an inner core housing inside the outer tire portion, where the inner core housing has an interior cylindrical wall, where the interior wall can have multiple ring like recesses teaches a novel apparatus and method for a quick and easy way to manually attach, remove and replace interchangeable rims onto a wheel/tire assembly and the wheel/tire assembly onto the wheel hubs at each end of a vehicle axle, without the use of any tools The details of the invention and various embodiments can be better understood by referring to the figures of the drawing. Referring to FIG. 1, a perspective view of the wheel hub and chassis interface is shown. The wheel hub is shown rotateably attached to a chassis 102 by an axle or bearing member not shown in this view. The wheel hub 100 has a main cylindrical shaft body 101 that extends outward away from the chassis for receiving a tire/wheel assembly thereon. The cylindrical shaft 101 has an outer perimeter surface 103 over which the tire/wheel assembly is installed. The cylindrical shaft body 101 extends from an inside end 110 to an outside end 108. Centrally located between the outside end 108 and the inside end 110 is a raised rib 104 that is utilized for laterally retaining the tire/wheel assembly. Proximate the outside end is a circumscribed octagon cap 106 which is utilized to prevent slippage or rotation of the tire/wheel assembly with respect to the cylindrical shaft of the wheel hub. The wheel hub 100 is also shown having a backstop 112 which can prevent the tire/wheel assembly from being pushed too far inward thereby not properly mating with the raised rib and further creating a frictional interface between the tire/wheel assembly and the side of the chassis. Referring FIG. 2, a frontal side plan view of the wheel hub is shown. This side plan view reveals the octagonal shape of the cap having a geometry to correspond with the octagonal shaped opening 306 of the tire/wheel assembly. The octagonal pattern is utilized to prevent slippage rotation between the cylindrical shaft of the wheel hub and the tire/wheel assembly. Other geometries could be utilized to obtain the same result. The concept is to utilize a cap having a geometry other than a circular cross section such as for example having a polygonal geometry thereby preventing rotation or slippage of the tire/wheel assembly with respect to the cylindrical shaft of the hub.

Referring to FIG. 3, a side perspective view of the tire/wheel assembly for the wheel hub interface is shown. The tire/wheel assembly 300 is shown having two main portions, the outer tire portion 302 and the inner core ring housing portion 304. The outer tire portion 302 can have a plurality of designs including various tread designs and tire heights. However, the inner core ring housing portion 304 essentially remains the same regardless of the tire/wheel assembly configuration such that the inner core ring housing portion is completely interchangeable with a plurality of chassis designs having a wheel hub as well as being fully interchangeable with various rim designs. The inner core ring housing portion 304 is shown having a octagonal opening 306 for receiving the cylindrical shaft of the wheel hub 100 which has an octagonal cap. The octagonal opening communicably opens to an interior bore having a cylindrical inner wall 308. The interior cylindrical wall has various octagonal ringed recessed sections as well as various circular ringed recesses. The circular ringed recesses 312 are utilized to laterally retain the tire/wheel assembly 300 to the wheel hub 100. There are also circular ringed recesses 311 utilized to retain a rim to the tire wheel assembly. The octagonal ring 310 are utilized to prevent slippage or rotation between the tire/wheel assembly 300 and the cylindrical shaft 101 of the wheel hub. The inner core ringed housing portion 304 can optionally be separated by an expansion seam 314 which allows the inner core to expand outward when a rim is press fit into the tire/wheel assembly or when the tire/wheel assembly is press fit on the cylindrical shaft of the hub. The expansion seam can be urged inward or biased inwardly by the resilience of the outer tire portion. Referring to FIG. 4, an opposing side perspective view of the tire/wheel assembly 300 for the rim interface is shown. This view reveals the circular opening 316 which communicably opens to a circular bore having the interior cylindrical wall 308. Again, the various recesses 311 are shown. This circular opening is for receiving the various rim designs. The circular bore has the octagonal recesses for preventing slippage and the circular recesses for resisting lateral movement. The octagonal annular sections of the bore need not be recessed with respect to the circular opening 316, which receives the rims.

Referring to FIG. 5, a perspective view of a cover is shown. The cover 500 internally has a cylindrical geometry with a circular cross section corresponding to the circular opening of the tire/wheel assembly. The cover 500 has a facing design 502 similar to that of a full-sized wheel for an automobile. The cover 500 also has a cylindrical sidewall 504 which forms the perimeter of the cover. The cylindrical sidewall 504 has thereon a raised rib 506 which extends about the perimeter of the sidewall. The raised rib 506 engages the circular ring recess of the interior cylindrical wall of the tire/wheel assembly. This rib laterally retains the cover in the tire/wheel assembly.

Figure 6:
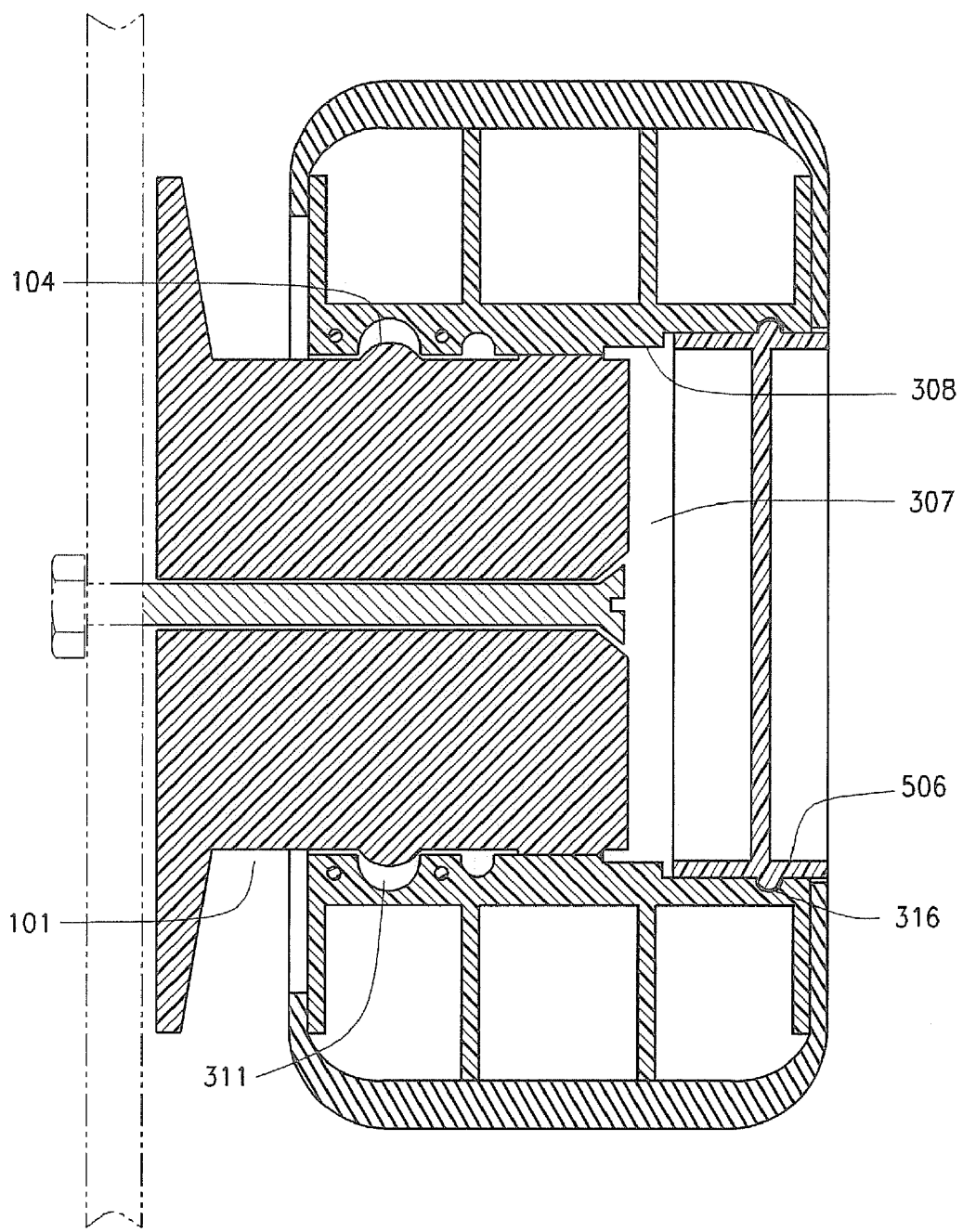
FIG. 6 is a lateral cross section of the tire/wheel assembly revealing the interior wall of the core ring housing.

FIG. 6 shows a lateral cross section of the tire/wheel assembly revealing the interior wall of the core ring housing. The wheel hub has the cylindrical shaft extending outward and having a raised rib and a raised circumscribed octagon cap. FIG. 6A is a front plan view of the cover showing a similar rib. The front plan view of the cover also shows the raised octagonal cap. The octagonal cap is located approximate the outside end and the rib is centrally located with respect to the inside end and the outside end. FIG. 7 provides a sectional view of the cover to tire/wheel to wheel hub interface.

One embodiment of the invention is an apparatus for quick mounting and dismounting a wheel and cover on a toy vehicle comprising a core housing 304 adapted for receiving a tire portion 302 about its outer perimeter where the core housing has an interior lateral cylindrical bore 307 where a cylindrical interior wall 308 of said bore 307 has a first and a second recess extending substantially along a first and second interior perimeter of said bore. This embodiment further comprises a wheel hub 100 having a cylindrical shaft 101 extending from and inside end 110 to a distal outside end 108 where said cylindrical shaft has an outer cylindrical surface 103, said surface having a first raised rib 104 circumscribed substantially about the perimeter of the surface and centrally disposed between the inside end and the outside end, and said first raised rib having a geometry to substantially conform to the first recess.

The cylindrical shaft 101 can be removably inserted in said bore such that said first raised rib removably engages said first recess. Another embodiment of the invention can include a cover having a cylindrical outer cover surface where the outer rim lnposelendsurface can have second raised rib circumscribed about the perimeter of the outer rim cover surface. The second raised rib can have a geometry to conform to the second recess. The cover can be removably inserted in said bore such that said second raised rib removably engages said second recess.

Another embodiment can have a third recess extending substantially along a third perimeter of said bore, and where said outer cylindrical surface of the wheel hub can have a raised cap circumscribed substantially about a second perimeter of the outer cylindrical surface proximate said outside end and said cap can have a second geometry to substantially conform to said third recess. With this embodiment, the cylindrical shaft can be removably inserted in said bore such that said first raised rib removably engages said recess and said cap removably engages said third recess. The first and second ribs can have a circular geometry and said cap can have a polygonal geometry that is circumscribed about the cylindrical shaft. The polygonal geometry can be octagonal. However, other polygonal geometries as well as other geometries will work if they are non-circular and operable to resist rotation of the core housing with respect to the wheel hub.

The present invention can be implemented as a method for quick mounting and dismounting a wheel on a toy vehicle comprising the steps of providing a core housing adapted for receiving a tire portion about its outer perimeter where the core housing has an interior cylindrical bore where a cylindrical interior wall of said bore has a recess extending substantially along an interior perimeter of said bore. The core housing can already have a tire installed thereon or one can be provided and installed. The process can further include providing a wheel hub having a cylindrical shaft extending from an inside end to a distal outside end where said cylindrical shaft has an outer cylindrical surface, and said surface can have a raised hub rib circumscribed substantially about the perimeter of the surface and centrally disposed between the inside end and the outside end, and said rib having a geometry to substantially conform to the recessed ring.

The operator can removably insert the cylindrical shaft of the wheel hub in said bore such that said rib removably engages said recess. The step of providing a core housing can also include providing a core housing where said cylindrical interior wall has a second and third recess extending substantially along a second and third perimeter of said bore, and a raised cap is circumscribed substantially about a second perimeter of said outer cylindrical surface proximate said outside end where said cap has a second non-circular geometry to substantially conform to said second recess. When inserting the user can also removably engage said second recess with said cap.

The method can also further comprise providing a rim having a cylindrical outer surface, where said outer rim surface has a second raised rib circumscribed about the perimeter of the outer rim surface. The operator can removably engage the second raised rib and third recess. The raised ribs and recesses can be generally referred to as complimenting engagement ring sections that have conforming geometries. Either component can have either the rib or raised ring section or the recessed ring section without departing from the invention.

The above method can be utilized in a retail environment where a purchaser can select a toy vehicle for purchase and can select from a variety of tire/wheels and rims and can quickly install them on the vehicle. The fact that installation does not require a screw or nut or special tool, makes to process of installation simple and safe such that a minor could perform the task quickly and safely.

The various rim and tire/wheel embodiment examples shown above illustrate a novel method and apparatus for a quick and easy way to manually attach, remove and replace. A user of the present invention may choose any of the above embodiment, or an equivalent thereof, depending upon the desired application. In this regard, it is recognized that various forms of the subject rim and tire/wheel design could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the sprit and scope of the present invention.

Other aspects, objects and advantages of the present invention can be obtained from a study of the drawings, the disclosure and the appended claims.

What is claimed is:

1. An apparatus for mounting and dismounting a wheel on a toy vehicle comprising:
   a core housing adapted for receiving a tire portion about an outer perimeter of said core housing where the core housing has an interior cylindrical bore where a cylindrical interior wall of said bore has a recess extending substantially along an interior perimeter of said bore;
   a wheel hub having a cylindrical shaft extending from an inside end to a distal outside end where said cylindrical shaft has an outer cylindrical surface, said surface having a raised hub rib circumscribed substantially about a perimeter of the outer cylindrical surface and centrally disposed between the inside end and the outside end, and said rib having a geometry substantially conforming to the recess; and said cylindrical shaft removably inserted in said bore such that said rib removably engages said recess.

2. The apparatus as recited in claim 1, where said bore has a non-circular interior section extending substantially along a second interior perimeter of said bore, and where said outer cylindrical surface has a raised cap circumscribed substantially about a second perimeter of the outer cylindrical surface proximate said outside end and said cap having a non-circular geometry to substantially conform to said non-circular section for resisting rotation of the core about the wheel hub.

3. The apparatus as recited in claim 2, where said cylindrical shaft is removably inserted in said bore such that said rib removably engages said recess and said cap removably engages said non-circular interior section.

4. The apparatus as recited in claim 3, where said rib has a circular geometry and said cap has a polygonal geometry.

5. The apparatus as recited in claim 4, where said polygonal geometry is octagonal.

6. An apparatus for mounting and dismounting a wheel and rim on a toy vehicle comprising:

a core housing adapted for receiving a tire portion about an outer perimeter of said core housing where the core housing has an interior cylindrical bore where a cylindrical interior wall of said bore has a first and a second recess extending substantially along a first and second interior perimeter of said bore;

a wheel hub having a cylindrical shaft extending from and inside end to a distal outside end, where said cylindrical shaft has an outer cylindrical surface, said surface having a first raised rib circumscribed substantially about the perimeter of the surface and centrally disposed between the inside end and the outside end, and said first raised rib having a geometry to substantially conform to the first recess;

said cylindrical shaft removably inserted in said bore such that said first raised rib removably engages said first recess;

a cover having a cylindrical outer rim surface, where said outer rim surface has a second raised rib circumscribed about the perimeter of the outer rim surface, said second raised rib having a geometry to conform to the second recess; and said rim removably inserted in said bore such that said second raised rib removably engages said second recess.

7. The apparatus recited in claim 6, where said bore has a non-circular interior section extending substantially along a third perimeter of said bore and where said outer cylindrical surface has a raised cap circumscribed substantially about a second perimeter of the outer cylindrical surface proximate said outside end and said cap having a second geometry to substantially conform to said non-circular interior section.

8. The apparatus as recited in claim 7, where said cylindrical shaft is removably inserted in said bore such that said first raised rib removably engages said first recess and said cap removably engages said non-circular interior section.

9. The apparatus as recited in claim 8, where said first and second ribs have a circular geometry and said cap has a polygonal geometry.

10. The apparatus as recited in claim 9, where said polygonal geometry is octagonal.

11. A method for mounting and dismounting a wheel on a toy vehicle comprising the steps of:

providing a core housing adapted for receiving a tire portion about an outer perimeter of said core housing where the core housing has an interior cylindrical bore where a cylindrical interior wall of said bore has a recess extending substantially along an interior perimeter of said bore;

providing a wheel hub having a cylindrical shaft extending from an inside end to a distal outside end where said cylindrical shaft has an outer cylindrical surface, said surface having a raised hub rib circumscribed substantially about the perimeter of the surface and centrally disposed between the inside end and the outside end, and said rib having a geometry to substantially conform to the recess; and removably inserting said cylindrical shaft in said bore such that said rib removably engages said recess.

12. The method as recited in claim 11, where the step of providing a core housing includes providing a core housing where said cylindrical interior wall has a non-circular interior section and third recess extending substantially along a second and third perimeter of said bore, and where providing said wheel hub includes providing a raised cap circumscribed substantially about a second perimeter of said outer cylindrical surface proximate said outside end where said cap has a second non-circular geometry to substantially conform to said non-circular interior section.

13. The method as recited in claim 11, where the step of removably inserting includes removably engaging said second recess with said cap.

14. The method as recited in claim 11, further comprising the step of providing a cover having a cylindrical outer rim surface, where said outer rim surface has a second raised rib circumscribed about the perimeter of the outer rim surface.

15. The method as recited in claim 14, further comprising the step of removably engaging the second raised rib and third recess.

16. An apparatus comprising:

a core housing adapted for receiving a tire portion about an outer perimeter of said core housing where the core housing has an interior cylindrical bore where a cylindrical interior wall of said bore has an engagement ring section extending substantially along an interior perimeter of said bore;

a wheel hub having a cylindrical shaft extending from an inside end to a distal outside end where said cylindrical shaft has an outer cylindrical surface, said surface having a complimenting engagement ring section circumscribed substantially about a perimeter of the outer cylindrical surface and centrally disposed between the inside end and the outside end, and said complimenting engagement ring section having a geometry substantially conforming to the engagement ring section, said cylindrical shaft removably inserted in said bore such that the engagement ring section engages the complimenting engagement ring section.

* * * * *

UNITED STATES PATENT AND TRADEMARK OFFICE
CERTIFICATE OF CORRECTION

PATENT NO. : 7,614,707 B2
APPLICATION NO. : 11/736141
DATED : November 10, 2009
INVENTOR(S) : Edward Jabbour, Jr.

It is certified that error appears in the above-identified patent and that said Letters Patent is hereby corrected as shown below:

In Col. 5, line 37, delete "Inposelendsurface" and replace with -- surface --

Signed and Sealed this

Fifth Day of January, 2010

David J. Kappos
*Director of the United States Patent and Trademark Office*